United States Patent
Zhang et al.

(10) Patent No.: US 12,518,406 B2
(45) Date of Patent: Jan. 6, 2026

(54) METHOD, APPARATUS, DEVICE, AND MEDIUM FOR DETERMINING VIDEO SMOOTHNESS

(71) Applicant: Beijing Zitiao Network Technology Co., Ltd., Beijing (CN)

(72) Inventors: Rui Zhang, Beijing (CN); Lixue Gong, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 20 days.

(21) Appl. No.: 18/686,347

(22) PCT Filed: Aug. 17, 2022

(86) PCT No.: PCT/CN2022/112903
§ 371 (c)(1),
(2) Date: Feb. 23, 2024

(87) PCT Pub. No.: WO2023/024986
PCT Pub. Date: Mar. 2, 2023

(65) Prior Publication Data
US 2024/0354968 A1   Oct. 24, 2024

(30) Foreign Application Priority Data
Aug. 23, 2021   (CN) .......................... 202110967767.1

(51) Int. Cl.
*G06T 7/254*  (2017.01)
*G06T 5/50*   (2006.01)
(Continued)

(52) U.S. Cl.
CPC .............. *G06T 7/254* (2017.01); *G06T 5/50* (2013.01); *G06T 5/70* (2024.01); *G06T 5/80* (2024.01); *G06T 2207/10016* (2013.01)

(58) Field of Classification Search
CPC .. G06T 7/254; G06T 5/80; G06T 5/70; G06T 5/50
See application file for complete search history.

(56) References Cited

U.S. PATENT DOCUMENTS

2009/0245372 A1   10/2009   Yamasaki

FOREIGN PATENT DOCUMENTS

| CN | 1157059 C | 7/2004 |
|---|---|---|
| CN | 1946163 A | 4/2007 |

(Continued)

OTHER PUBLICATIONS

Extended European Search Report for European Application No. 22860332.0, mailed on Nov. 12, 2024, 11 pages.
(Continued)

*Primary Examiner* — On S Mung
(74) *Attorney, Agent, or Firm* — Astute IP Law Group (57) ABSTRACT

A method, apparatus, device, and medium for determining video smoothness is provided. The method includes: acquiring a target video; determining a motion vector between different video frames by performing motion estimation on different video frames in the target video, the motion vector including a lens motion vector and an object motion vector, the lens motion vector indicates a position change of a lens between different video frames, and the object motion vector indicates a position change of the same photographed object in different video frames; and determining smoothness of the target video according to the motion vector between different video frames.

18 Claims, 2 Drawing Sheets

(51) Int. Cl.
    *G06T 5/70*     (2024.01)
    *G06T 5/80*     (2024.01)

(56) References Cited

FOREIGN PATENT DOCUMENTS

| | | | |
|---|---|---|---|
| CN | 101557516 | A | 10/2009 |
| CN | 103024598 | A | 4/2013 |
| CN | 103561354 | A | 2/2014 |
| CN | 104079926 | A | 10/2014 |
| CN | 107437257 | A | 12/2017 |
| CN | 107968946 | A | 4/2018 |
| CN | 110378930 | A | 10/2019 |
| CN | 112015644 | A | 12/2020 |
| CN | 113079368 | A | 7/2021 |
| JP | 2006-157428 | A | 6/2006 |
| JP | 2011-049633 | A | 3/2011 |
| JP | 2013-165485 | A | 8/2013 |
| JP | 2020-095673 | A | 6/2020 |
| JP | 2020-150448 | A | 9/2020 |
| JP | 2021-068443 | A | 4/2021 |

OTHER PUBLICATIONS

Vazquez M., et al., "Real-time Video Smoothing for Small RC Helicopters", Proceedings of the 2009 IEEE International Conference on Systems, Man, and Cybernetics, Oct. 11, 2009, 6 pages.
Xu R., et al., "A Novel Algorithm for Video Smoothness Evaluation", 2008 International Conference on Advanced Computer Theory and Engineering, Dec. 20, 2008, 5 pages.
Written Opinion for International Application No. PCT/CN2022/112903, mailed on Oct. 28, 2022, 7 Pages.
International Search Report PCT/CN2022/112903, mailed Oct. 28, 2022, 6 pages.
Office Action for Japanese Patent Application No. 2023-578986, mailed Jun. 4, 2024, 8 pages.
First Office Action for Chinese Patent Application No. 202110967767.1, mailed on May 24, 2025, 16 pages.
Office Action for Chinese Patent Application No. 202110967767.1, mailed on Nov. 7, 2025, 26 pages.

METHOD, APPARATUS, DEVICE, AND MEDIUM FOR DETERMINING VIDEO SMOOTHNESS

CROSS-REFERENCE TO RELATED APPLICATIONS

This is a national stage application based on International Patent Application No. PCT/CN2022/112903, filed on Aug. 17, 2022, which claims priority to Chinese Patent Application No. 202110967767.1, entitled "Method, Apparatus, Device and Medium for Determining Video Smoothness", filed on Aug. 23, 2021, the disclosures of which are incorporated herein by reference in their entireties.

INVENTION FIELD

The present disclosure relates to the field of video processing, especially to a method, apparatus, device, and medium for determining a video smoothness.

BACKGROUND

With the development of science and technology, watching online videos has become an important part of people's life, and people's requirement to videos becomes higher and higher.

Video smoothness is one of the important indicators for evaluating video quality and affect the perception. At present, frame rate is commonly used to evaluate the videos. If the frame rate is high, the video smoothness is high, and if it is low, the video smoothness is low. However, the perception of video smoothness by human eyes is closely related to scenes in the video content. The method for evaluating video smoothness by frame rate does not consider the influence of human vision and has a low accuracy.

SUMMARY OF THE INVENTION

To solve or at least partially solve the aforesaid technical problems, the present disclosure provides a method apparatus, device and medium for determining a video smoothness.

Embodiments of the present disclosure provide a method for determining a video smoothness, comprising:
  acquiring a target video;
  determining a motion vector between different video frames by performing motion estimation on the different video frames in the target video, wherein the motion vector includes a lens motion vector that indicate a position change of lens between the different video frames, and an object motion vector that indicates a position change of a same capture object in the different video frames; and
  determining a smoothness of the target video according to the motion vector between the different video frames.

Embodiments of the present disclosure provide an apparatus for determining video smoothness, comprising a video acquisition module, a motion estimation module and a smoothness module.

The video acquisition module is configured to acquire a target video.

The motion estimation module is configured to determine a motion vector between different video frames by performing the motion estimation on the different video frames in the target video, wherein the motion vector comprises a lens motion vector and an object motion vector, wherein the lens motion vector indicates a position change of lens between the different video frames, and the object motion vector indicates a position change of a same capture object in the different video frames.

The smoothness module is configured to determine a smoothness of the target video according to the motion vectors between the different video frames.

Embodiments of the present disclosure provide an electronic device, comprising a processor and a memory that stores processor-executable instructions, wherein the processor is configured to read the executable instructions from the memory and execute the instructions to perform the method for determining the video smoothness provided in the embodiments of the present disclosure.

Embodiments of the present disclosure provide a computer-readable storage medium, with a computer program stored thereon, wherein the computer program is executed to perform the method for determining video smoothness according to the embodiments of the present disclosure.

Embodiments of the present disclosure provide a computer program product, comprising computer programs/instructions, wherein when the computer programs/instructions are executed by a processor, the method for determining a video smoothness provided in the embodiments of the present disclosure is performed.

The technical solutions provided in the embodiments of the present disclosure have the following advantages in comparison with the prior art: the solutions of determining the video smoothness provided in embodiments of the present disclosure include: acquiring a target video, determining a motion vector between different video frames by performing a motion estimation on different video frames in the target video, the motion vector comprising a lens motion vector and an object motion vector, and determining a smoothness of the target video according to the motion vector between the different video frames. By means of the above technical solutions, the video smoothness can be determined by the motion estimation on two different types of motions between the different video frames. Since the motion estimation result of the two different types of motions are related to the characteristics of human vision, the accuracy of determining the video smoothness is improved.

BRIEF DESCRIPTION OF THE DRAWINGS

The above and other features, advantages, and aspects of various embodiments of the present disclosure will become more apparent with reference to the accompanying drawings and the following embodiments. Throughout the drawings, the same or similar reference signs represent the same or similar elements. It should be understood that the accompanying drawings are schematic, and the components and elements are not necessarily drawn to scale.

DETAILED DESCRIPTION OF THE INVENTION

Hereinafter the embodiments of the present disclosure are described more detailedly with reference to the accompanying drawings. Although some embodiments of the present disclosure are shown in the accompanying drawings, it should be understood that the present disclosure can be implemented in various forms, and should not be construed as limited to the embodiments set forth herein. On the contrary, the embodiments are provided to understand the present disclosure more completely and fully. It should be understood that the accompanying drawings and embodiments of the present disclosure are merely used for illustrative purposes, and are not intended to limit the protection scope of the present disclosure.

It should be understood that the steps of the method described in various embodiments of the present disclosure can be performed in different orders, and/or in parallel. In addition, the method embodiments may include additional steps and/or omit some steps as shown. The scope of the present disclosure is not limited in this regard.

As used herein, the term "comprise" and its variants mean inclusion in open mode, that is, "comprising, but being not limited to". The term "based on" means "at least partially based on". The term "an/one embodiment" represents "at least one embodiment"; the term "another embodiment" represents "at least one additional embodiment"; and the term "some embodiments" represents "at least some embodiments". The definitions of other terms are provided in the following description.

It is to be noted that the concepts such as "first" and "second" mentioned in the present disclosure are only used to distinguish different apparatuses, modules or units, and are not intended to limit the order of functions performed by these apparatuses, modules or units or the interdependence relationships between the apparatuses, modules or units.

It is to be noted that the modifications with "a/an/one" or "a plurality of/multiple" mentioned in the present disclosure are schematic, rather than restrictive. Persons skilled in the art should understand that they should be construed as "one or more", unless specifically noted in the context.

The names of messages or information interacted between multiple apparatuses in the present disclosure are merely used for illustrative purpose, and are not intended to limit the scope of the messages or information.

Video smoothness is one of important indicators for evaluating video quality and influencing viewing experience. At present, it is commonly evaluated by frame rate. If the frame rate is high, it is considered that the video smoothness is high, and if it is low, it is considered that the video smoothness is low. However, the perception of video smoothness by human eyes is closely related to scenes in the video content. For example, when the video picture is still, there is no video stuttering even at a low frame rate; but in scenes where the picture motion lasts for a long time due to the movement of the capturing device, there will be a strong stuttering feeling at a low frame rate. Therefore, the frame rates required for a smooth video are different in different scenes.

At present, there is still a need for studying on video smoothness, and it is mainly evaluated by frame rates. Video smoothness expressed by frame rates cannot reflect the influence of human vision and thus the accuracy is low; while it cannot be quantified when considering the influence of the human vision. To solve the above problems, embodiments of the present application provide a method for determining a video smoothness, which is introduced below with reference to particular embodiments.

Figure 1:
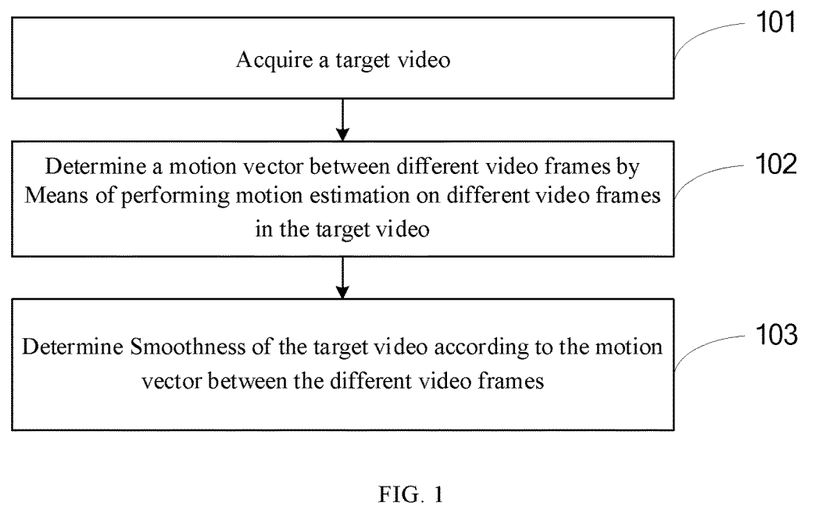
FIG. 1 is a schematic flowchart of a method for determining a video smoothness provided in an embodiment of the present disclosure.

FIG. 1 is a schematic flowchart of a method for determining a video smoothness provided in an embodiment of the present disclosure. The method can be performed by an apparatus for determining video smoothness, wherein the apparatus can be implemented by software and/or hardware, and can typically be integrated in an electronic device. As shown in FIG. 1, the method comprises the steps as follows.

Step 101: acquiring a target video.

The target video may be any one video whose smoothness need to be analyzed and determined, and the specific type and source thereof are not limited. For example, the target video can be those either captured in real time or downloaded from the Internets.

Step 102: determining a motion vector between different video frames by performing the motion estimation on the different video frames in the target video.

In the embodiment of the present application, the motion in the video can be divided into motions on the two dimensions: an overall motion of picture caused by lens motion and a detail motion of captured object in the picture content. Therefore, the motion vector may include a lens motion vector and an object motion vector. The lens motion vector indicates a position change of lens between the different video frames, and the object motion vector indicates a position change of the same captured object between the different video frames.

The video frame can be a minimum unit constituting the video, and can be extracted from the target video. Since the target video may comprise multiple video frames, a distance between the different video frames can be set according to the actual condition when the motion estimation is performed. The embodiment of the present disclosure takes one video frame as an example of the distance between the different video frames, that is, the different video frames are adjacent video frames.

Specifically, the determining the motion vector between the different video frames by performing the motion estimation on the different video frames in the target video may include: extracting multiple video frames from the target video; determining motion vectors of multiple image blocks between the different video frames to obtain multiple motion vectors, with each video frame containing multiple image blocks; clustering the multiple motion vectors to obtain a multi-class vector set; and determining a motion vector between the different video frames according to the multi-class vector set.

After the target video is acquired, the multiple video frames contained in the target video can be extracted. The different video frames are indicated as a first video frame and a second video frame. The first and second video frames are divided into multiple non-overlapping image blocks wherein the number of the image blocks is not limited. For example, in an embodiment of the present application, a video frame is divided into 16×16 image blocks. Then, a best-matching image block in the second video frame is searched by applying a three-step-search method for block matching on each image block in the first video frame, and then a motion vector can be determined according to the two matched image blocks, and thereby a motion vector corresponding to each image block is determined. Subsequently, the multiple motion vectors can be clustered and analyzed to determine the motion vectors of the different video frames. When the different video frames are adjacent video frames, the motion vector of every two adjacent video frames can be determined. The methods for carrying out the clustering described above are not limited, e.g., the clustering can be carried out by density-based spatial clustering of applications with noise (DBSCAN).

Taking a search range [−7,7] as an example, the specific process of the above Three Step Search method may include: Step 1: taking the current position of the matching block as the center, and a distance of 4 as the interval, to search for 8 points at the top, bottom, left, and right and diagonal corners so that the 8 points, along with the center, constitute a four-cell square shape, i.e., "田", with each side length equal to 8. Step 2: taking the closest point in the search result of step 1 as the center to search 8 points at the top, bottom, left, and right and diagonal corners, by halving the previous interval, to search for a four-cell square shape, i.e., "田", with each side length equal to 4. Step 3: repeating step 2 by further halving the interval, until the interval equal to 1, to find the most similar point that is the point with minimum matching error. Optionally, the sum of absolute differences (SAD) can be recorded as the confidence coefficient of the motion vector. Optionally, a motion vector calculated by the three-step-search method described above typically may be companied with a lot of noise, and smooth filtering may be applied to the motion vector of each image block by using a 5×5 median filtering method to remove the noise.

Optionally, the determining the motion vector between the different video frames according to the multi-class vector set may include: determining the vector set with the largest number of the motion vectors in the multi-class vector set as a first set, and a set that is different from the first set as a second set; determining an average of the motion vectors in the first set as the lens motion vector included in the motion vector between the different video frames; and determining an average of the motion vectors in the second set as the object motion vector included in the motion vector between the different video frames.

The motion vectors of the multiple image blocks between the different video frames are clustered to obtain a multi-class vector set as the clustering result, wherein each class of vector set may include multiple motion vectors, and then the number of the motion vectors in the multi-class vector set can be determined. The vector set with the largest number of motion vectors is determined as the first set, which can be construed as the set characterizing the overall motion, and other vector set that is different from the first set is determined as the second set, which can be construed as the set characterizing the detail motions. Then, an average of the motion vectors in the first set may be determined as the lens motion vector between the different video frames; and an average of the motion vectors in the second set is determined as the object motion vector between the different video frames.

Step 103: determining the smoothness of the target video according to the motion vector between the different video frames.

In an embodiment of the present application, the determining the smoothness of the target video according to the motion vector between the different video frames may include: determining a unit smoothness of the different video frames according to the motion vector between the different video frames and a pre-established motion-smoothness mapping relationship; and determining the smoothness of the target video based on the unit smoothness.

The motion-smoothness mapping relationship can be obtained by labeling with human eyes, that is, the motion-smoothness mapping relationship is subjectively established based on the characteristics of human vision. The motion-smoothness mapping relationship includes a mapping relationship between the motion vector and a smoothness quantized value, wherein the smoothness quantized value refers to a subjective score of the video. The greater the smoothness quantized value is, the smoother it indicates the smoothness.

In an embodiment of the present application, the motion in the video is divided into motions on two dimensions, that is, an overall motion of picture caused by lens motion and a detail motion of a captured object in the picture content. The motion amplitude of the two types of motions described above can be divided into four grades including: motionless state, slight motion, normal motion, and intense motion. Multiple types of motion scenes can be generated by combinations of the above types and motion amplitudes, and each motion scene corresponds to a different smoothness quantized value. Specially, referring to Table 1, it is a motion quantification table reflecting a relationship between the motion and the specific smoothness quantized value.

TABLE 1

Motion Quantification Table
(Scores 0 to 3, wherein the higher the score is, the more stable/smoother it indicates.)

| Scoring Rules | 0 | 1 | 2 | 3 |
|---|---|---|---|---|
| Smoothness | Very unsmooth | Unsmooth | Slightly unsmooth | Smooth |
| Overall Motion | Shaking violently | Shaking | Shaking slightly | Still |
| Detail motion | Moving violently | Moving significantly | Moving slightly | Quasi-still |

As shown in Table 1 above, the overall motion and the detail motion are quantified to scores 0 to 3, respectively, and the higher the score is, the slighter the motion it indicates. Sum of the scores of two types of motion states is determined as the smoothness quantized values of motions in five types of scenes from score 2 to score 6. Specially, referring to Table 2, which is a table of the motion-smoothness mapping relationship, the motion scenes of the video can be divided into five types according to the motion conditions, and each type of scene corresponds to a different smoothness quantized value, wherein the higher the smoothness quantized value is, the slighter the comprehensive motion it indicates.

TABLE 2

Table of motion-smoothness mapping relationship

| Sum of overall motion and detail motion | Remarks | Frame rate at smoothness |
|---|---|---|
| 6 | Both overall motion and detail motion are motionless | Frame rate 1 |
| 5 | Slightly shaking in overall motion or detail motion | Frame rate 2 |
| 4 | Slightly shaking in both overall motion and detail motion; or shaking significantly in one of the overall motion and the detail motion and the other is motionless | Frame rate 3 |
| 3 | Shaking significantly in one of the overall motion and the detail motion and the other one is shaking slightly | Frame rate 4 |
| 2 | Both the overall motion and | Frame rate 5 |

TABLE 2-continued

Table of motion-smoothness mapping relationship

| Sum of overall motion and detail motion | Remarks | Frame rate at smoothness |
|---|---|---|
| | the detail motion are shaking significantly | |

In the embodiment of the present application, the determining the unit smoothness between the different video frames according to the motion vector between the different video frames and the pre-established motion-smoothness mapping relationship may include: determining a first smoothness quantized value corresponding to the lens motion vector and a second smoothness quantized value corresponding to the object motion vector in the different video frames; and determining a sum of the first quantized value and the second quantized value as a unit smoothness quantized value which indicates the unit smoothness.

After determining the motion vector between the different video frames in the target video, a first smoothness quantized value corresponding to the lens motion vector and a second smoothness quantized value corresponding to the object motion vector between the different video frames may be determined by look-up the table of the motion-smoothness mapping relationship, and the sum of the first quantized value and the second quantized value are determined as the unit smoothness quantized value, which indicates the unit smoothness.

In an embodiment of the present application, the determining the smoothness of the target video based on the unit smoothness may include: performing a weighted average on the unit smoothness quantized values of the different video frames to obtain a target smoothness quantized value; and determining the smoothness of the target video based on the target smoothness quantized value. Optionally, the determining the smoothness of the target video based on the target smoothness quantized value may include: determining the target smoothness quantized value as the smoothness of the target video.

Since the target video may include multiple video frames, after the unit smoothness quantized values between the different video frames are determined, a weighted average can be performed on the multiple unit smoothness quantized values to calculate the target smoothness quantized value. When the different video frames are adjacent video frames, a weighted average can be performed on the unit smoothness quantized values of every two adjacent video frames to obtain the target smoothness quantized value. Then, the target smoothness quantized value can be determined as the smoothness of the target video. Optionally, for target video, the motion scenes that do not appear many times in succession can be removed by means of smooth filtering, that is, to remove the unit smoothness quantized values that do not appear many times in succession, thereby improving the accuracy for determining the video smoothness.

In an embodiment of the present application, the above motion-smoothness mapping relationship may further comprise a mapping relationship between the smoothness quantized value and a smooth frame rate, wherein the smooth frame rate is used to indicate the frame rate required by videos with different smoothness quantized values to achieve visual smoothness. The smooth frame rate can be construed as a frame rate required by videos with different smoothness quantized values to achieve human visual smoothness.

Referring to Table 2, the higher the smoothness quantitative score is, the smaller the comprehensive motion will be, and the smoother subjective feeling can be achieved at a smaller frame rate. The lower the smoothness quantitative score is, the requirement for frame rate is higher. As shown in Table 2, the frame rate required to achieve view smoothness in each motion scene is different. Specially, the process for determining the smooth frame rate corresponding to each smoothness quantized value may include: collecting the high-frame rate videos of the 5 types of scenes as described above, generating multiple low-frame-rate videos corresponding to each high-frame-rate video by evenly dropping frames; labeling all the high-frame-rate and low-frame-rate videos in the different types of scenes with the smoothness quantized values, and establishing a mapping relationship between the different types of motion scenes and the smooth frame rate based on the labeled result, that is, establishing a mapping relationship between the smoothness quantized value and the smooth frame rate. The table of motion-smoothness mapping relationship in Table 2 may further include a column of motion vectors, which are not shown in the table.

Optionally, the determining the smoothness of the target video based on the target smoothness quantized value may include: determining the smoothness of the target video based on the comparison result of the smooth frame rate corresponding to the target smoothness quantized value with the current frame rate of the target video. Optionally, the determining the smoothness of the target video based on the comparison result of the smooth frame rate corresponding to the target smoothness quantized value with the current frame rate of the target video may include: determining the smoothness of the target video to be unsmooth when the current frame rate of the target video is less than the smooth frame rate corresponding to the target smoothness quantized value; and otherwise, determining the smoothness of the target video to be smooth.

After the target smoothness quantized value is determined, the smooth frame rate corresponding to the target smoothness quantized value can be determined by lookup the table of the motion-smoothness mapping relationship. By comparing the smooth frame rate with the current frame rate of the target video, the smoothness of the target video is determined to be unsmooth if the current frame rate of the target video is less than the smooth frame rate corresponding to the target smoothness quantized value; and otherwise, it is determined to be smooth.

In the above solution, the smoothness of the target video may be determined as either a result of being smooth or unsmooth, or a specific smoothness quantized value. The greater the smoothness quantized value is, the smoother it indicates the smoothness.

In the solution of determining the video smoothness provided in the embodiment of the present application acquires a target video, determines a motion vector comprising a lens motion vector and an objection motion vector between different video frames by performing the motion estimation on the different video frames of the target video, and determines a smoothness of the target video according to the motion vector between the different video frames. By way of the above technical solutions, the video smoothness can be determined by the motion estimation on two different types of motions between the different video frames. Since the motion estimation results of the two different types of motions are related to the characteristics of human vision, the accuracy of determining the video smoothness is improved.

Figure 2:
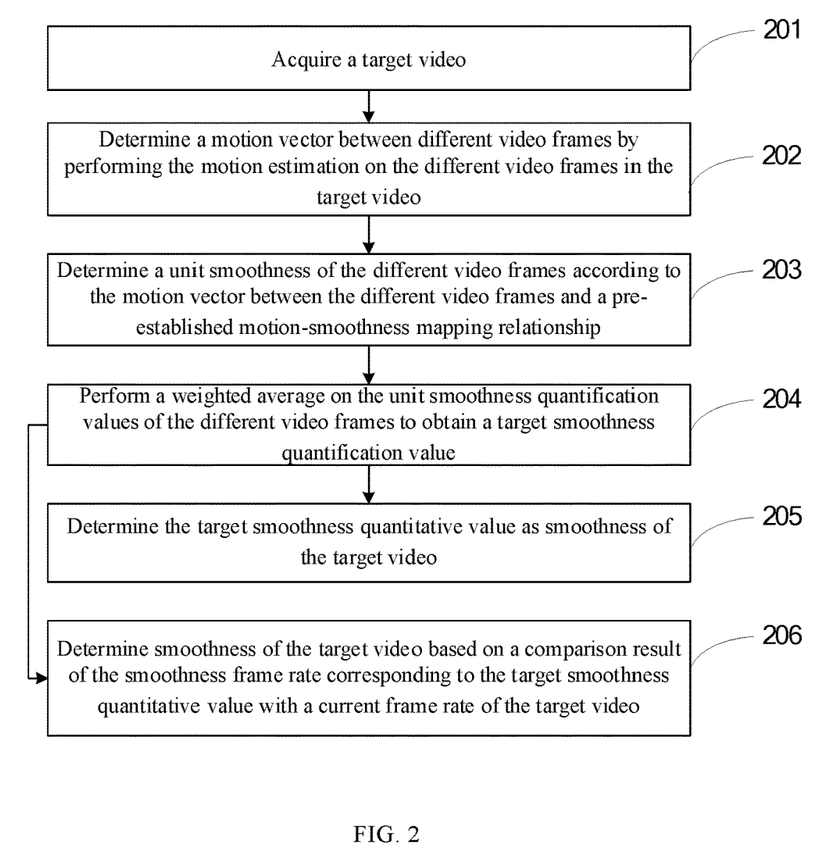
FIG. 2 is a schematic flowchart of another method for determining a video smoothness provided in an embodiment of the present disclosure.

FIG. 2 is a schematic flowchart of another method for determining a video smoothness provided in an embodiment of the present disclosure. As shown in FIG. 2, the method includes the steps as follows.

Step 201: acquiring a target video.

Step 202: determining a motion vector between different video frames by performing the motion estimation on the different video frames in the target video.

In the above step, the motion vector includes a lens motion vector that indicates a position change of lens between the different video frames and an object motion vector that indicates a position change of the same captured object between the different video frames.

Optionally, the different video frames are adjacent video frames.

Optionally, the determining the motion vector between the different video frames by performing the motion estimation on the different video frames in the target video may include: extracting multiple video frames from the target video; determining motion vectors of multiple image blocks between the different video frames to obtain multiple motion vectors, each video frame comprising multiple image blocks; clustering the multiple motion vectors to obtain a multi-class vector set; and determining a motion vector between the different video frames according to the multi-class vector set.

Optionally, the determining the motion vector between the different video frames according to the multi-class vector set may include: determining the vector set with the largest number of motion vectors in the multi-class vector set as a first set, and a set different from the first set as a second set; determining an average of the motion vectors in the first set as the lens motion vector included in the motion vector between the different video frames; and determining an average of the motion vectors in the second set as the object motion vector included in the motion vector between the different video frames.

Step 203: determining a unit smoothness of the different video frames according to the motion vector between the different video frames and a pre-established motion-smoothness mapping relationship.

In the above step, the motion-smoothness mapping relationship comprises a mapping relationship between the motion vector and a smoothness quantized value. The greater the smoothness quantized value is, the smoother it indicates the smoothness.

Optionally, the determining the unit smoothness between the different video frames according to the motion vector between the different video frames and the pre-established motion-smoothness mapping relationship may include: determining a first smoothness quantized value corresponding to the lens motion vector and a second smoothness quantized value corresponding to the object motion vector in the different video frames; and determining a sum of the first quantized value and the second quantized value as a unit smoothness quantized value that indicates the unit smoothness.

Step 204: performing a weighted average on the unit smoothness quantized values of the different video frames to obtain a target smoothness quantized value.

After step 204, step 205 or step 206 can be performed.

Step 205: determining the target smoothness quantized value as a smoothness of the target video.

Step 206: determining the smoothness of the target video based on the comparison result of the smooth frame rate corresponding to the target smoothness quantized value with the current frame rate of the target video.

Optionally, the motion-smoothness mapping relationship may further include a mapping relationship between the smoothness quantized value and the smooth frame rate, wherein the smooth frame rate is used to indicate a frame rate required by videos with different smoothness quantized values to achieve visual smoothness.

Optionally, the determining the smoothness of the target video based on the comparison result of the smooth frame rate corresponding to the target smoothness quantized value with the current frame rate of the target video may include: determining the smoothness of the target video to be unsmooth when the current frame rate of the target video is less than the smooth frame rate corresponding to the target smoothness quantized value; and otherwise, determining the smoothness of the target video to be smooth.

At present, it is impossible to quantify the values according to the influence of human vision, and it is difficult to provide helpful information for improving the video smoothness. The method for determining the video smoothness provided in the present solution is simple and efficient. With the inter-frame motion estimation, the classification of motion scenes and the smoothness output can be realized, and the output smoothness can be quantified. By comparing the current frame rate of the video with a smooth frame rate, an auto-adaptive video compression and frame interpolation technology can be conveniently introduced based on the comparison results to improve the video smoothness. For example, in video compression, a frame dropping operation is carried out in circumstances where a frame rate requirement is not high (motionless or small motions); and in the frame interpolation technology, an auto-adaptive frame interpolation is carried out in videos of different scenes.

The solution of determining the video smoothness provided in the embodiments of the present disclosure includes: acquiring a target video, determines a motion vector between different video frames by performing a motion estimation on the different video frames in the target video, and determining a unit smoothness of the different video frames according to the motion vector between the different video frames and a pre-established motion-smoothness mapping relationship, performing a weighted average on the unit smoothness quantized values of the different video frames to obtain a target smoothness quantized value, and determining the target smoothness quantized value as a smoothness of the target video, or determining a smoothness of the target video based on the comparison result between a smooth frame rate corresponding to the target smoothness quantized value and the current frame rate of the target video. By using the above technical solution, the video smoothness can be determined by the motion estimation on the two types of motions in the video and the pre-labeled motion-smoothness mapping relationship. Because the motion-smoothness mapping relationship is subjectively established based on human vision, it sufficiently considers the characteristics of human vision, thereby improving the accuracy of determining the video smoothness.

Figure 3:
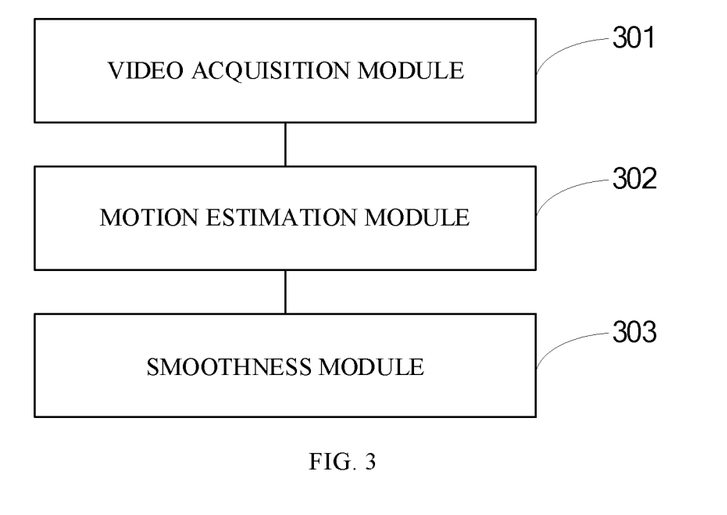
FIG. 3 is a structural schematic diagram of an apparatus for determining video smoothness provided in an embodiment of the present disclosure.

FIG. 3 is a structural schematic diagram of an apparatus for determining video smoothness provided in an embodiment of the present disclosure. The apparatus may be implemented by software and/or hardware, and may typically be integrated in an electronic device. As shown in FIG. 3, the apparatus comprises: a video acquisition module 301, a motion estimation module 302, and a smoothness module 303.

The video acquisition module 301 is configured to acquire a target video.

The motion estimation module 302 is configured to determine a motion vector between different video frames by performing a motion estimation on the different video frames in the target video, wherein the motion vector which includes a lens motion vector and an object motion vector, the lens motion vector indicates changes in position of lens between the different video frames, and the object motion vector indicates changes in position of the same captured object between the different video frames.

The smoothness module 303 is configured to determine a smoothness of the target video according to the motion vectors between the different video frames.

Optionally, the smoothness module 303 may include: a unit-smoothness unit and a determining unit.

The unit-smoothness unit is configured to determine a unit smoothness of the different video frames according to the motion vector between the different video frames and a pre-established motion-smoothness mapping relationship.

The determining unit is configured to determine a smoothness of the target video based on the unit smoothness.

Optionally, the motion-smoothness mapping relationship may include a mapping relationship between the motion vector and a smoothness quantized value. The greater the smoothness quantized value is, the smoother it indicates the smoothness.

Optionally, the unit-smoothness unit is configured to perform the operations as follows.

The unit-smoothness unit is configured to determine a first smoothness quantized value according to the lens motion vector and a second smoothness quantized value corresponding to the object motion vector of the different video frames based on the motion vector between the different video frames and the motion-smoothness mapping relationship.

The unit-smoothness unit is configured to determine a sum of the first smoothness quantized value and the second smoothness quantized value as a unit smoothness quantized value that indicates the unit smoothness.

Optionally, the unit-smoothness unit is configured to perform the operations as follows.

The unit-smoothness unit is configured to perform a weighted average on the unit smoothness quantized values of the different video frames to obtain a target smoothness quantized value.

The unit-smoothness unit is configured to determine the smoothness of the target video based on the target smoothness quantized value.

Optionally, the motion-smoothness mapping relationship may further include a mapping relationship between the smoothness quantized value and the smooth frame rate, wherein the smooth frame rate is used to indicate a frame rate required by videos with different smoothness quantized values to achieve visual smoothness.

Optionally, the unit-smoothness unit is configured to perform the operations as follows.

The unit-smoothness unit is configured to determine the target smoothness quantized value as the smoothness of the target video.

Alternatively, the unit-smoothness unit is configured to determine the smoothness of the target video based on the comparison result of the smooth frame rate corresponding to the target smoothness quantized value with the current frame rate of the target video.

Optionally, the unit-smoothness unit is configured to perform the operations as follows.

The unit-smoothness unit is configured to determine the smoothness of the target video to be unsmooth when the current frame rate of the target video is less than the smooth frame rate corresponding to the target smoothness quantized value; and otherwise determine the smoothness of the target video to be smooth.

Optionally, the motion estimation module 302 is configured to perform the operations as follows.

The motion estimation module is configured to extract multiple video frames from the target videos.

The motion estimation module is configured to determine motion vectors of multiple image blocks between the different video frames to obtain multiple motion vectors, wherein each video frame comprises multiple image blocks.

The motion estimation module is configured to cluster the multiple motion vectors to obtain a multi-class vector set.

The motion estimation module is configured to determine the motion vector between the different video frames according to the multi-class vector set.

Optionally, the motion estimation module 302 is configured to perform the operations as follows.

The motion estimation module is configured to determine a vector set with the largest number of motion vectors in the multi-class vector set as a first set, and a set different from the first set as a second set.

The motion estimation module is configured to determine an average of the motion vectors in the first set as the lens motion vector in the motion vector between the different video frames.

The motion estimation module is configured to determine an average of the motion vectors in the second set as the object motion vector between the different video frames.

Optionally, the different video frames are adjacent video frames.

The apparatus for determining video smoothness provided in the embodiment of the present disclosure can perform the method for determining a video smoothness provided in any one embodiment of the present disclosure, and have corresponding functional modules for performing the method and achieve the beneficial effects.

An embodiment of the present disclosure further provides a computer program product comprising a computer program/instruction, wherein the computer program/instruction performs the method for determining a video smoothness provided in any one embodiment of the present disclosure when being executed by a processor.

It can be implemented wholly or partially in form of a computer program product when being implemented with software. The computer program product comprises one or more computer instructions. When the computer program instructions are loaded and executed on a computer, the process or function described according to the embodiment of the present application can be produced in whole or in part. The computer can be a general computer, a dedicated computer, a computer network, or other programmable apparatus. The computer instructions can be stored in a computer-readable storage medium, or transmitted from a computer-readable storage medium to another computer-readable storage medium. For example, the computer instructions can be transmitted from a website, computer, server, or data center to another website, computer, server, or data center in wired (e.g., coaxial-cable, optical fiber, digital subscriber line (DSL)) or wireless (e.g., infrared, wireless, microwave, etc.) manner. The computer-readable storage medium can be any useful computer-accessible medium or an integrated data storage device including one or more useful mediums such as server, data center, and the like. The useful medium can be a magnetic medium (e.g., floppy disk, hard disk, magnetic tape), an optical medium (e.g., digital video disc (DVD)), or a semiconductor medium (e.g., solid state disk (SSD)) and the like.

Figure 4:
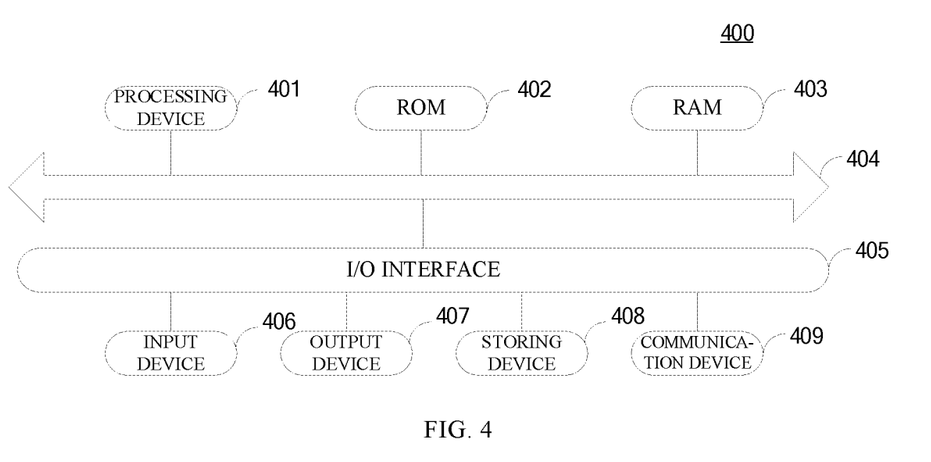
FIG. 4 is a structural schematic diagram of an electronic device provided in an embodiment of the present application.

FIG. 4 is a structural schematic diagram of an electronic device provided in an embodiment of the present application. Hereinafter, specially referring to FIG. 4, it shows a structural schematic diagram adapted to implement an electronic device 400 of the embodiment of the present disclosure. The electronic device 400 of the embodiment of the present disclosure may include, but are not limited to, mobile terminals such as mobile phone, laptop, digital broadcast receiver, PDA (Personal Digital Assistant), PAD (Portable Android Device), PMP (Portable Media Player), and vehicle terminal (e.g., vehicle navigator terminal) and fixed terminals such as digital TV and desktop computer. The electronic device shown in FIG. 4 is merely an example, and should not bring any limitation to the function and application scope of the embodiment of the present disclosure.

As shown in FIG. 4, the electronic device 400 may include a processing means (e.g., a central processing unit, a graphics processing unit, etc.) 401, which can perform various appropriate actions and processes according to a program stored in a read only memory (ROM) 402 or a program loaded from a storing means 408 into a random-access memory (RAM) 403. The RAM 403 further stores various programs and data required to operate the electronic device 400. The processing means 401, ROM 402 and RAM 403 are interconnected with each other via a bus 404. An input/out (I/O) interface 405 is also connected to the bus 404.

Typically, the following means can be connected to the I/O interface 405: an input means 406 including, e.g., a touch screen, a touch pad, a keyboard, a mouse, a camera, a microphone, an accelerometer, a gyroscope, etc.; an output means 407 including, e.g., a liquid crystal display (LCD), a speaker, a vibrator, etc., a storing means 408 including, e.g., a magnetic tape, a hard disc, etc.; and a communication means 409. The communication means 409 can allow the electronic device 400 to communicate with other devices in wired or wireless manner to exchange data. Although FIG. 4 shows the electronic device 400 including various means, it should be understood that it is not required to implement or have all the means as shown. Alternatively, it can implement or have more or less means.

Particularly, according to the embodiment of the present disclosure, a process described above with reference to the flowchart can be performed as a computer software program. For example, an embodiment of the present disclosure comprises a computer program product comprising a computer program carried on a non-transitory computer-readable medium, wherein the computer program comprises program codes configured to execute the method shown in the flowchart. In such an embodiment, the computer program can be downloaded and installed via the communication means 409 from the Internet, or installed from the storing means 408, or installed from the ROM 402. When the computer program is executed by the processing means 401, the functions defined in the method for determining a video smoothness of the embodiment of the present disclosure are performed.

It should be noted that the above computer-readable medium in the present disclosure may be a computer-readable signal medium, or a computer-readable storage medium, or any combination thereof. For example, the computer-readable storage medium may be, but is not limited to, an electric, magnetic, optical, electromagnetic, infrared or semiconductor system, apparatus, device, or any combination thereof. More specific examples of the computer-readable storage medium may include, but are not limited to: an electric connection with one or more wires, portable computer magnetic disc, hard disc, random accessible memory (RAM), read-only memory (ROM), erasable programmable read-only memory (EPROM or flash memory), optical fiber, portable compact disc read-only memory (CD-ROM), optical storage device, magnetic storage device, or any suitable combination thereof. In the present disclosure, the computer-readable storage medium can be any tangible medium containing or storing a program that can be used by or in combination with an instruction execution system, apparatus or device. And in the present disclosure, the computer-readable signal medium may include a data signal propagated in baseband or as a part of carrier wave, which carries computer-readable program codes. Such propagated data signal can be in many forms, including, but not limited to, electromagnetic signal, optical signal, or any suitable combination thereof. The computer-readable signal medium may also be any computer-readable medium in addition to the computer-readable storage medium, which can send, propagate, or transmit a program used by or in combination with an instruction execution system, apparatus, or device. The program codes contained in the computer-readable medium may be transmitted by any suitable medium including, but not limited to, electric wire, optical cable, RF (radio frequency), or any suitable combination thereof.

In some embodiments, the user and the server can communicate by using any network protocol that is currently known or will be developed in future, such as, HTTP (HyperText Transfer Protocol), and can be interconnected with a digital data communication in any form or medium (e.g., communication network). Examples of the communication network comprise local area network ("LAN"), wide area network ("WAN"), international network (e.g., the Internets) and end-to-end network (e.g., ad hoc end-to-end network), and any network that is currently known or will be developed in future.

The above computer-readable medium can be contained in the above electronic device; or it can also be independently present without being integrated into the electronic device.

The above computer-readable medium carries one or more programs that, when being executed by the electronic device, allow the electronic device to: acquire a target video; determine a motion vector between different video frames by performing the motion estimation on the different video frames in the target video, wherein the motion vector comprises a lens motion vector that indicates a position change of lens between the different video frames and an object motion vector that indicates a position change of the same captured object between the different video frames; and determine a smoothness of the target video according to the motion vector between the different video frames.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program codes may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), and etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, the present disclosure provides a method for determining a video smoothness, comprising:
    acquiring a target video;
    determining a motion vector between different video frames by performing the motion estimation on the different video frames in the target video, wherein the motion vector comprises a lens motion vector that indicates a position change of lens between the different video frames and an object motion vector that indicates a position change of the same captured object between the different video frames; and
    determining a smoothness of the target video according to the motion vector between the different video frames.

According to one or more embodiments of the present disclosure, in the method for determining the video smoothness provided in the present disclosure, the determining the smoothness of the target video according to the motion vector between the different video frames comprises:
    determining a unit smoothness of the different video frames according to the motion vectors between the different video frames and a pre-established motion-smoothness mapping relationship; and
    determining a smoothness of the target video based on the unit smoothness.

According to one or more embodiments of the present disclosure, in the method for determining the video smoothness provided in the present disclosure, the motion-smoothness mapping relationship comprises a mapping relationship between the motion vector and a smoothness quantized value. The greater the smoothness quantized value is, the smoother it indicates the smoothness.

According to one or more embodiments of the present disclosure, in the method for determining the video smoothness provided in the present disclosure, the determining the smoothness of the different video according to the motion vector between the different video frames and the pre-established motion-smoothness relationship comprises:
    determine a first smoothness quantized value according to the lens motion vector and a second smoothness quantized value corresponding to the object motion vector of the different video frames based on the motion vector between the different video frames and the motion-smoothness mapping relationship; and
    determining a sum of the first smoothness quantized value and the second smoothness quantized value as the unit smoothness quantized value that indicates a unit smoothness.

According to one or more embodiments of the present disclosure, in the method for determining the video smoothness provided in the present disclosure, the determining the smoothness of the target video based on the unit smoothness comprises:
    performing a weighted average on the unit smoothness quantized values of the different video frames to obtain a target smoothness quantized value; and
    determining the smoothness of the target video based on the target smoothness quantized value.

According to one or more embodiments of the present disclosure, in the method for determining the video smoothness provided in the present disclosure, the motion-smoothness mapping relationship further comprises a mapping relationship between the smoothness quantized value and the smooth frame rate, wherein the smooth frame rate is used to indicate a frame rate required by videos with different smoothness quantized values to achieve visual smoothness.

According to one or more embodiments of the present disclosure, in the method for determining the video smoothness provided in the present disclosure, the determining the smoothness of the target video based on the target smoothness quantized value comprises: determining the target smoothness quantized value as the smoothness of the target video;
    or determining the smoothness of the target video based on the comparison result of the smooth frame rate corresponding to the target smoothness quantized value with the current frame rate of the target video.

According to one or more embodiments of the present disclosure, in the method for determining the video smoothness provided in the present disclosure, the determining the smoothness of the target video based on the comparison result between the smooth frame rate corresponding to the target smoothness quantized value and the current frame rate of the target video comprises:

determining the smoothness of the target video to be unsmooth when the current frame rate of the target video is less than the smooth frame rate corresponding to the target smoothness quantized value; and otherwise determine the smoothness of the target video to be smooth.

According to one or more embodiments of the present disclosure, in the method for determining the video smoothness provided in the present disclosure, the determining the motion vector between the different video frames by performing the motion estimation on the different video frames in the target video comprises:

extracting multiple video frames from the target videos;
determining motion vectors of multiple image blocks between the different video frames to obtain multiple motion vectors, wherein each video frame comprises multiple image blocks;
clustering the multiple motion vectors to obtain a multi-class vector set; and determining the motion vector between the different video frames according to the multi-class vector set.

According to one or more embodiments of the present disclosure, in the method for determining the video smoothness provided in the present disclosure, the determining the motion vector between the different video frames according to the multi-class vector set comprises: determining a vector set with the largest number of the motion vectors in the multi-class vector set as a first set, and a set different from the first set as a second set;

determining an average of the motion vectors in the first set as the lens motion vector in the motion vector between the different video frames; and
determining an average of the motion vectors in the second set as the object motion vector between the different video frames.

According to one or more embodiments of the present disclosure, in the method for determining the video smoothness provided in the present disclosure, the different video frames are adjacent video frames.

According to one or more embodiments of the present disclosure, the present disclosure provides an apparatus for determining video smoothness, comprising:

a video acquisition module configured to acquire a target video;
a motion estimation module configured to determine a motion vector comprising a lens motion vector and an object motion vector between different video frames by performing the motion estimation on the different video frames in the target video, wherein the lens motion vector indicates changes in position of lens between the different video frames, and the object motion vector indicates changes in position of the same captured object between the different video frames; and
a smoothness module configured to determine a smoothness of the target video according to the motion vectors between the different video frames.

According to one or more embodiments of the present disclosure, in the apparatus for determining the video smoothness provided in the present disclosure, the motion estimation module comprises:

a unit-smoothness unit configured to determine a unit smoothness of the different video frames according to the motion vector between the different video frames and a pre-established motion-smoothness mapping relationship; and
a determining unit configured to determine a smoothness of the target video based on the unit smoothness.

According to one or more embodiments of the present disclosure, in the apparatus for determining the video smoothness provided in the present disclosure, the motion-smoothness mapping relationship comprises a mapping relationship between the motion vector and a smoothness quantized value. The greater the smoothness quantized value is, the smoother it indicates the smoothness.

According to one or more embodiments of the present disclosure, in the apparatus for determining the video smoothness provided in the present disclosure, the unit smoothness module is specifically configured to:

determine a first smoothness quantized value according to the lens motion vector and a second smoothness quantized value corresponding to the object motion vector of the different video frames based on the motion vector between the different video frames and the motion-smoothness mapping relationship; and
determine a sum of the first smoothness quantized value and the second smoothness quantized value as the unit smoothness quantized value that indicates a unit smoothness.

According to one or more embodiments of the present disclosure, in the apparatus for determining the video smoothness provided in the present disclosure, the unit-smoothness unit is specifically configured to:

perform a weighted average on the unit smoothness quantized values of the different video frames to obtain a target smoothness quantized value; and determine the smoothness of the target video based on the target smoothness quantized value.

According to one or more embodiments of the present disclosure, in the apparatus for determining the video smoothness provided in the present disclosure, the motion-smoothness mapping relationship further comprises a mapping relationship between the smoothness quantized value and the smooth frame rate, wherein the smooth frame rate is used to indicate a frame rate required by videos with different smoothness quantized values to achieve visual smoothness.

According to one or more embodiments of the present disclosure, in the apparatus for determining the video smoothness provided in the present disclosure, the unit smoothness module is specifically configured to:

determine the target smoothness quantized value as the smoothness of the target video; or determine the smoothness of the target video based on the comparison result of the smooth frame rate corresponding to the target smoothness quantized value with the current frame rate of the target video.

According to one or more embodiments of the present disclosure, in the apparatus for determining the video smoothness provided in the present disclosure, the unit smoothness module is specifically configured to:

determine the smoothness of the target video to be unsmooth when the current frame rate of the target video is less than the smooth frame rate corresponding to the target smoothness quantized value; and otherwise determine the smoothness of the target video to be smooth.

According to one or more embodiments of the present disclosure, in the apparatus for determining the video smoothness provided in the present disclosure, the motion estimation module is specially configured to:

extract multiple video frames from the target videos;

determine motion vectors of multiple image blocks between the different video frames to obtain multiple motion vectors, wherein each video frame comprises multiple image blocks;

cluster the multiple motion vectors to obtain a multi-class vector set; and determine the motion vector between the different video frames according to the multi-class vector set.

According to one or more embodiments of the present disclosure, in the apparatus for determining the video smoothness provided in the present disclosure, the motion estimation module is specially configured to:

determine a vector set with the largest number of motion vectors in the multi-class vector set as a first set, and a set different from the first set as a second set;

determine an average of the motion vectors in the first set as the lens motion vector in the motion vector between the different video frames; and determine an average of the motion vectors in the second set as the object motion vector between the different video frames.

According to one or more embodiments of the present disclosure, in the apparatus for determining the video smoothness provided in the present disclosure, the different video frames are adjacent video frames.

According to one or more embodiments of the present disclosure, the present disclosure provides an electronic device comprising:

a processor; and a memory configured to store the processor-executable instructions;

wherein the processor is configured to read the executable instructions from the memory, and execute the instructions to perform any one method for determining a video smoothness provided in the present disclosure.

According to one or more embodiments of the present disclosure, the present disclosure provides a computer-readable storage medium having a computer program stored thereon, wherein the computer program is configured to perform any one method for determining a video smoothness provided in the present disclosure.

According to one or more embodiments of the present disclosure, the present disclosure provides a computer program product comprising a computer program/instruction, wherein the computer program/instruction performs the method for determining a video smoothness provided in any one embodiment of the present disclosure when being executed by a processor.

The above description is merely illustrative of preferred embodiments of the present disclosure and the applied technical principles. Those skilled in the art should understand that the disclosure scope involved in the present disclosure is not limited to technical solutions formed by the specific combinations of the above technical features, but should encompass other technical solutions formed by any combination of the above technical features or equivalent features without departing the above disclosure concepts. For example, the technical solutions formed by replacing the above features with the features having similar functions disclosed in (but not limited to) this disclosure.

Moreover, although various operations are described in a specific order, it should be not be construed that these operations are required to be performed in the shown specific order or in a sequential order. Under certain circumstances, multitasking and parallel processing may be beneficial. Likewise, although several specific implementation details are contained in the above discussion, they should not be construed as limiting the scope of the present disclosure. Some features described in the context of separate embodiments can also be combined in a single embodiment. On the contrary, various features described in the context of a single embodiment can also be implemented in multiple embodiments, alone or in any sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims.

What is claimed is:

1. A method for determining a video smoothness, comprising:

acquiring a target video;

determining a motion vector between different video frames in the target video by performing the motion estimation on the different video frames, wherein the motion vector comprises a lens motion vector and an object motion vector, wherein the lens motion vector indicates a position change of lens between the different video frames, and the object motion vector indicates a position change of a same capture object in the different video frames; and determining a smoothness of the target video according to the motion vector between the different video frames;

wherein the determining the smoothness of the target video according to the motion vectors between the different video frames comprises:

determining a unit smoothness of the different video frames according to the motion vectors between the different video frames and a pre-established motion-smoothness mapping relationship; and determining a smoothness of the target video based on the unit smoothness.

2. The method according to claim 1, wherein the motion-smoothness mapping relationship comprises a mapping relationship between the motion vector and a smoothness quantized value, wherein the greater the smoothness quantized value is, the smoother it indicates the smoothness.

3. The method according to claim 2, wherein the determining the unit smoothness of the different video frames according to the motion vectors between the different video frames and the pre-established motion-smoothness mapping relationship comprises:

determining a first smoothness quantized value according to the lens motion vector and a second smoothness quantized value corresponding to the object motion vector of the different video frames based on the motion vector between the different video frames and the motion-smoothness mapping relationship; and determining a sum of the first smoothness quantized value and the second smoothness quantized value as a unit smoothness quantized value that indicates the unit smoothness.

4. The method according to claim 2, wherein the determining the smoothness of the target video based on the unit smoothness comprises:
performing a weighted average on the unit smoothness quantized values of the different video frames to obtain a target smoothness quantized value; and
determining the smoothness of the target video based on the target smoothness quantized value.

5. The method according to claim 4, wherein the motion-smoothness mapping relationship further comprises a mapping relationship between the smoothness quantized value and a smooth frame rate, wherein the smooth frame rate indicates a frame rate required by videos with different smoothness quantized values to achieve visual smoothness.

6. The method according to claim 5, wherein the determining the smoothness of the target video based on the target smoothness quantized value comprises:
determining the target smoothness quantized value as the smoothness of the target video; or
determining the smoothness of the target video based on the comparison result of the smooth frame rate corresponding to the target smoothness quantized value with the current frame rate of the target video.

7. The method according to claim 6, wherein the determining the smoothness of the target video based on the comparison result between the smooth frame rate corresponding to the target smoothness quantized value and the current frame rate of the target video comprises:
determining the smoothness of the target video to be unsmooth when the current frame rate of the target video is less than the smooth frame rate corresponding to the target smoothness quantized value; and otherwise, determining the smoothness of the target video to be smooth.

8. The method according to claim 1, wherein the determining the motion vector between the different video frames by performing the motion estimation on the different video frames in the target video comprises:
extracting multiple video frames from the target videos;
determining motion vectors of multiple image blocks between the different video frames to obtain multiple motion vectors, wherein each video frame comprises multiple image blocks;
clustering the multiple motion vectors to obtain a multi-class vector set; and
determining the motion vector between the different video frames according to the multi-class vector set.

9. The method according to claim 8, wherein the determining the motion vector between the different video frames according to the multi-class vector set comprises:
determining a vector set with the largest number of the motion vectors in the multi-class vector set as a first set, and a set different from the first set as a second set;
determining an average of the motion vectors in the first set as the lens motion vector in the motion vector between the different video frames; and
determining an average of the motion vectors in the second set as the object motion vector between the different video frames.

10. The method according to claim 1, wherein the different video frames are adjacent video frames.

11. An apparatus for determining video smoothness, comprising:
a video acquisition module configured to acquire a target video;
a motion estimation module configured to determine a motion vector between different video frames by performing the motion estimation on the different video frames in the target video, wherein the motion vector comprises a lens motion vector and an object motion vector, wherein the lens motion vector indicates a position change of lens between the different video frames, and the object motion vector indicates a position change of a same capture object in the different video frames; and
a smoothness module configured to determine a smoothness of the target video according to the motion vectors between the different video frames;
wherein the determining the smoothness of the target video according to the motion vectors between the different video frames comprises:
determining a unit smoothness of the different video frames according to the motion vectors between the different video frames and a pre-established motion-smoothness mapping relationship; and
determining a smoothness of the target video based on the unit smoothness.

12. An electronic device, comprising:
a processor; and
a memory configured to store processor-executable instructions;
wherein the processor is configured to read the executable instructions from the memory, and execute the instructions to:
acquire a target video;
determine a motion vector between different video frames in the target video by performing the motion estimation on the different video frames, wherein the motion vector comprises a lens motion vector and an object motion vector, wherein the lens motion vector indicates a position change of lens between the different video frames, and the object motion vector indicates a position change of a same capture object in the different video frames; and
determine a smoothness of the target video according to the motion vector between the different video frames;
wherein the smoothness module is further configured to:
determine a unit smoothness of the different video frames according to the motion vectors between the different video frames and a pre-established motion-smoothness mapping relationship; and
determine a smoothness of the target video based on the unit smoothness.

13. A non-transitory computer-readable storage medium characterized by having a computer program stored thereon, wherein the computer program is configured to perform the method for determining a video smoothness according to claim 1.

14. A non-transitory computer program product, comprising computer programs/instruction, wherein a processor is caused to perform the method for determining a video smoothness according to claim 1 when the computer programs/instruction are executed by the processor.

15. The apparatus according to claim 11, wherein the motion-smoothness mapping relationship comprises a mapping relationship between the motion vector and a smoothness quantized value, wherein the greater the smoothness quantized value is, the smoother it indicates the smoothness.

16. The apparatus according to claim 15, wherein the smoothness module is further configured to:
determine a first smoothness quantized value according to the lens motion vector and a second smoothness quantized value corresponding to the object motion vector of the different video frames based on the motion vector between the different video frames and the motion-smoothness mapping relationship; and determine a sum of the first smoothness quantized value and the second smoothness quantized value as a unit smoothness quantized value that indicates the unit smoothness.

17. The apparatus according to claim 15, wherein the smoothness module is further configured to:

perform a weighted average on the unit smoothness quantized values of the different video frames to obtain a target smoothness quantized value; and determine the smoothness of the target video based on the target smoothness quantized value.

18. The apparatus according to claim 17, wherein the motion-smoothness mapping relationship further comprises a mapping relationship between the smoothness quantized value and a smooth frame rate, wherein the smooth frame rate indicates a frame rate required by videos with different smoothness quantized values to achieve visual smoothness.

\* \* \* \* \*